United States Patent
Cankaya et al.

(10) Patent No.: US 7,646,730 B2
(45) Date of Patent: Jan. 12, 2010

(54) AVAILABILITY AWARE COST MODELING FOR OPTICAL CORE NETWORKS

(75) Inventors: Hakki C. Cankaya, Dallas, TX (US); Ana Lardies, Plano, TX (US); Gary Ester, Plano, TX (US)

(73) Assignee: Alcatel Lucent, Paris (FR)

( * ) Notice: Subject to any disclaimer, the term of this patent is extended or adjusted under 35 U.S.C. 154(b) by 817 days.

(21) Appl. No.: 10/926,818

(22) Filed: Aug. 26, 2004

(65) Prior Publication Data

US 2005/0113098 A1    May 26, 2005

Related U.S. Application Data

(60) Provisional application No. 60/523,855, filed on Nov. 20, 2003, provisional application No. 60/548,127, filed on Feb. 26, 2004.

(51) Int. Cl.
    *H04L 12/28* (2006.01)
(52) U.S. Cl. .................................. 370/254; 370/431
(58) Field of Classification Search ......... 370/229–231, 370/254, 252, 255, 256, 431, 433, 437, 468
    See application file for complete search history.

(56) References Cited

U.S. PATENT DOCUMENTS

| | | | |
|---|---|---|---|
| 5,598,532 A | 1/1997 | Liron et al. | |
| 6,909,700 B1 * | 6/2005 | Benmohamed et al. | 370/255 |
| 2002/0198991 A1 | 12/2002 | Gopalakrishnan | |
| 2004/0017783 A1 * | 1/2004 | Szentesi et al. | 370/256 |
| 2005/0073962 A1 * | 4/2005 | Zabele et al. | 370/254 |
| 2005/0111375 A1 * | 5/2005 | Ravindran et al. | 370/254 |

FOREIGN PATENT DOCUMENTS

CA    2291378 A1    8/2000

* cited by examiner

*Primary Examiner*—Aung S Moe
*Assistant Examiner*—Kerri M Rose
(74) *Attorney, Agent, or Firm*—Garlick, Harrison & Markison, LLP

(57) ABSTRACT

A sequential iterative methodology is used to generate a solution space with different cost/availability values for multiple network architectures from which an optimal or near-optimal solution can be determined. A modeling module (10) provides a cost value for a network architecture under consideration and, once cost modeling is done, an availability analysis is performed for the architecture under analysis. If a relatively few connections prevent a model from acceptability, the availability analysis module (12) reveals the causing factors of the unsatisfactory availability for those few connections and suggests that the modeling perform further optimisations on those causing factors. This iterative process is repeated until an optimum or near-optimum acceptable solution is found; if no acceptable solution is found, the solutions generated in the availability analysis module are reviewed to find the best available solution.

12 Claims, 5 Drawing Sheets

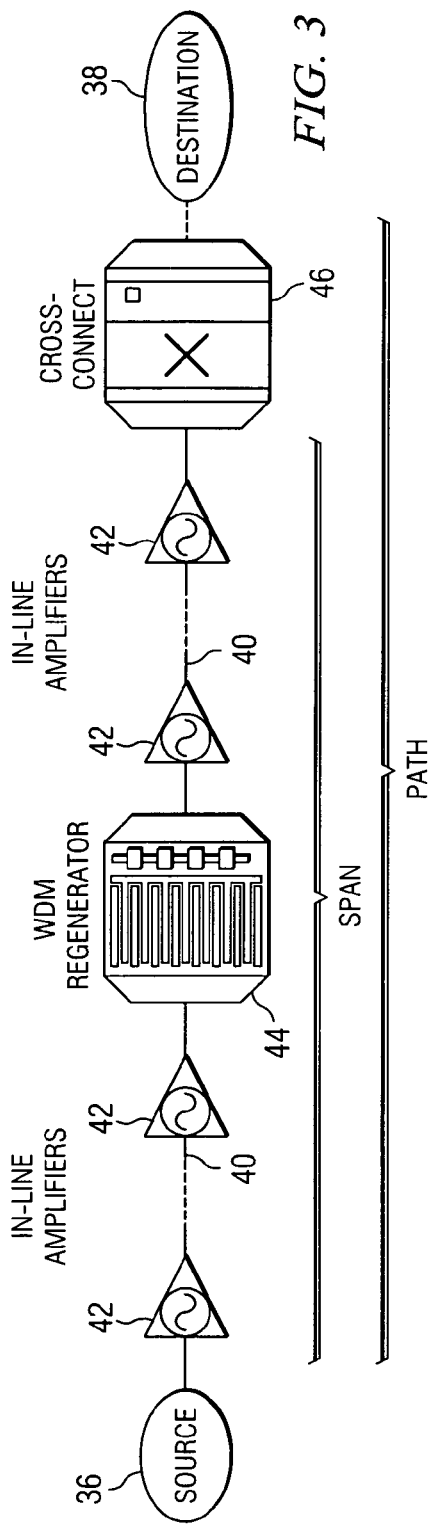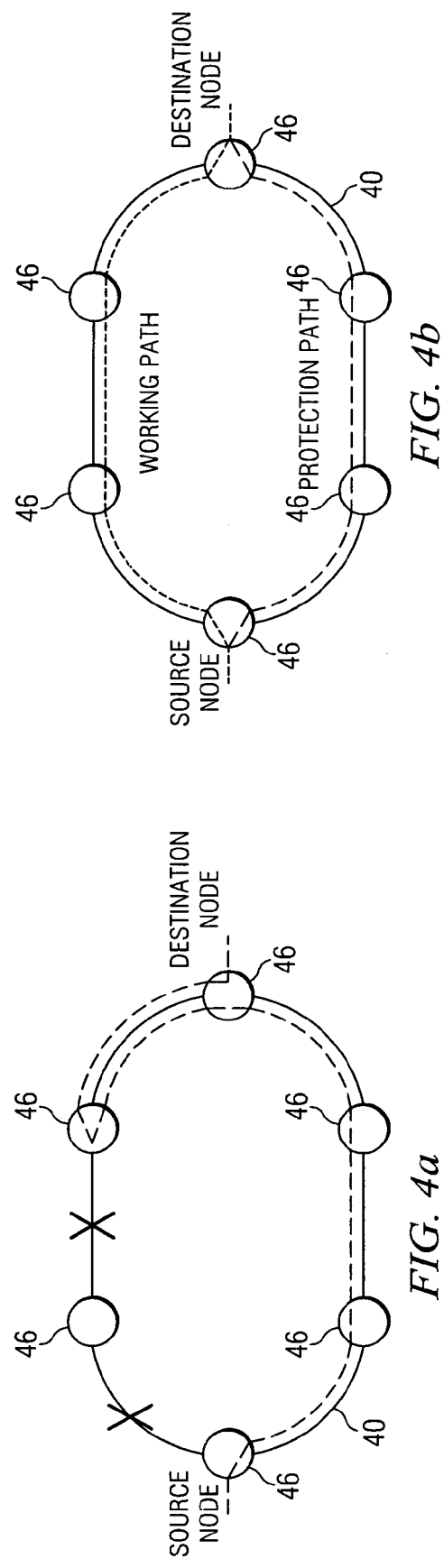
FIG. 3
FIG. 4b
FIG. 4a

US 7,646,730 B2

AVAILABILITY AWARE COST MODELING FOR OPTICAL CORE NETWORKS

CROSS-REFERENCE TO RELATED APPLICATIONS

The present U.S. Patent Application claims priority pursuant to 35 U.S.C. §119(e) to the following U.S. Provisional Patent Applications which are hereby incorporated herein by reference in their entirety and made part of the present U.S. Patent Application for all purposes:
1. U.S. Provisional Application Ser. No. 60/523,855, entitled "Availability Aware Cost Modeling of Mesh Architectures for Long-Haul Networks,", filed Nov. 20, 2003, expired.
2. U.S. Provisional Application Ser. No. 60/548,127, entitled "A Methodology for Availability-aware Cost Modeling of Long-Haul Networks,", filed Feb. 26, 2004, expired.

STATEMENT OF FEDERALLY SPONSORED RESEARCH OR DEVELOPMENT

Not Applicable

BACKGROUND OF THE INVENTION

1. Technical Field

This invention relates in general to communications networks and, more particularly, to optimization of a network design.

2. Description of the Related Art

In the design and modification of a network architecture, such as a local exchange network or a core (backbone) network, both capital expenditures and operational expenditures should be considered in evaluating the total cost of the network. Capital expenditures would include the cost of new equipment and, if necessary, additional lines (such as optical fiber lines). Operational expenditures include those expenses necessary to operate the network at the service provider's expectations. In determining the operational expenditures, the availability of the network should be considered are part of the cost, through maintenance and repair efforts.

The solution that provides the lowest capital expenditures may often not result in the lowest total cost. This would be true if the network with the lowest capital expenditures does not meet the service provider's requirements for availability or if additional operational expenses would be required to bring the network's availability to a reasonable level in an attempt to shorten the Mean Time To Repair (MTTR) by spending more on repair crew efforts.

With the large number of options available for a network configuration, such as parameters related to traffic grooming, express routes, network dimensioning, and so on, it is virtually impossible to find a solution that is a near optimum solution. Integrating similar constraints relating to availability, would increase the complexity of the problem which is already non-trivial to cope with. Moreover, the objectives of availability and cost are often conflicting. This means that when one of the objectives (e.g. cost or availability) improves, the other one (availability or cost) worsens. Service providers generally are satisfied to find a solution that works, without considering other options. This can lead to excessive present costs due to capital expenditures or excessive future costs due to ongoing operational expenditures.

With communications being a highly cost competitive field, it has become more necessary to reduce total costs. Therefore, a need has arisen for finding a near-optimal solution for designing a network.

BRIEF SUMMARY OF THE INVENTION

In the present invention, a communications network structure is determined by iteratively performing the steps of: (1) generating a cost value for a network architecture, (2) performing an availability analysis to identify which traffic-carrying paths, if any, have availability values below a predetermined threshold, and (3) improving the network architecture responsive to the identified traffic-carrying paths.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which:

FIG. 3 illustrates a path through a mesh architecture;

FIGS. 4a through 4b illustrate connections through a ring architecture;

DETAILED DESCRIPTION OF THE INVENTION

The present invention is best understood in relation to FIGS. 1-10 of the drawings, like numerals being used for like elements of the various drawings.

Figure 1:
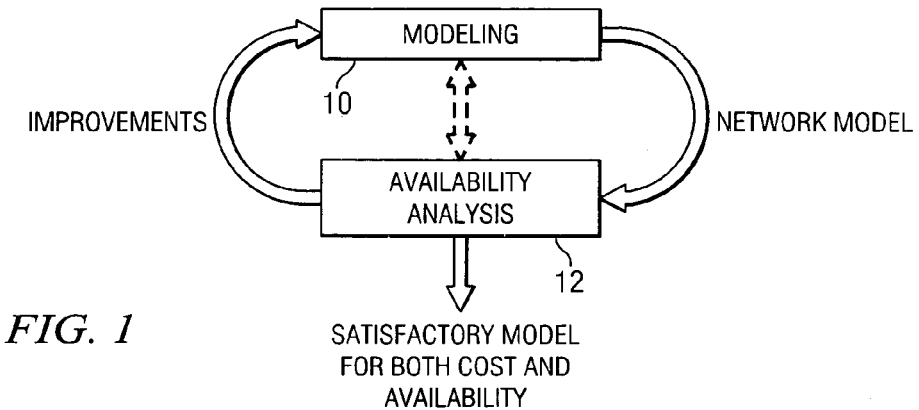
FIG. 1 illustrates a block diagram of a general flow for designing a cost-effective network.

FIG. 1 illustrates a diagram showing a sequential iterative methodology capable of finding a solution space with different cost/availability values for multiple network architectures from which an optimal or near-optimal solution can be determined. FIG. 1 uses two main modules: modeling module 10 and availability module 12. Generally speaking, the modeling module provides a cost value for a network architecture under consideration and, once cost modeling is done, an availability analysis is performed for the architecture under analysis. The modeling module 10 and availability module 12 can be implemented on a computing device as described below.

The availability analysis includes calculations for end-to-end (e2e) connection availability for a channel carrying end-to-end traffic demand in the traffic demand matrix. The analysis may also include the average and the worst channel availability. The analysis module 12 provides the planner/designer with information identifying the weakest connection in the network, the availability distribution for all the end-to-end connections and the connections that are below the desired minimum level of availability acceptable for a channel connection.

It is possible that the overall availability and cost of a network architecture are satisfactory except the availability value for a few channels. In such a case, the availability analysis module 12 reveals the causing factors of the unsatisfactory availability for those few connections and suggests modeling modifications. Another scenario would be such that the percentage of connections that have availability values below acceptable level is high. Then, the availability analysis module may suggest switching to another architecture, even though it is not the cheapest, that may provide an acceptable level of overall availability. This feedback to the modelling module indicates whether iterative improvements in the solution space of a particular architecture is likely to produce a usable solution, or whether it is prudent to switch to another architecture in the solution volume for further considerations. The improvements on an architecture, on the other hand, can be done in this iterative manner until a reasonable level of satisfaction is reached.

Accordingly, by iteratively performing an availability analysis of a network, improving the network based on identified factors causing unsatisfactory availability for the network, and performing a cost analysis of the improved network, a near-optimum network can be heuristically achieved.

The invention described herein could be used to analyze various network architectures in a variety of applications. For purposes of illustration, the invention will be discussed in connection with backbone (core) networks where different ring and mesh architectures are evaluated.

Figure 2:
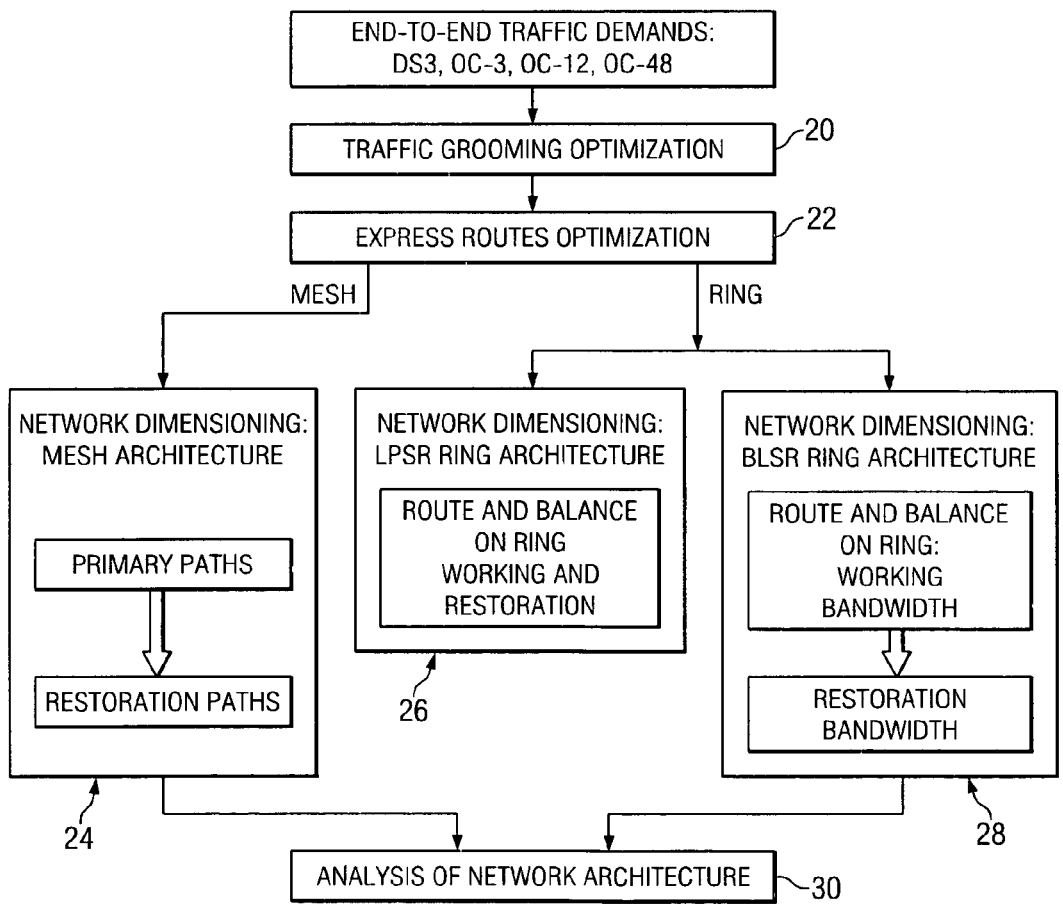
FIG. 2 illustrates the cost modeling step of FIG. 1.

FIG. 2 is a flow chart describing the cost modeling module 10. Initially, the modeling module 10 performs the cost modeling and provides a network model for each architecture under consideration, optimized by cost. According to the architectural specifics and features, steps and sequence of procedures may differ in the execution of the modeling process. The modeling process, as shown in FIG. 2, is designed for a few different network architectures. These architectures are restorable mesh networks with and without express routes; and two ring architectures namely BLSR (Bidirectional Line Switch Protection Rings) and LSPR (Line Shared Protection Rings).

Briefly, a single layer mesh architecture without express routes is one of the architectures used for backbone networks. In this type of network, all optical channels going through each intermediate node will be electrically regenerated, and spans will be designed to guarantee that the quality of the optical signal is always at the required level. Additional capacity in the network is added for restoration purposes. The bandwidth dedicated to restoration is hared for all demands in an optimal way.

Another network architecture type is a mesh network with express routes. The network cost is dominated by the node cost, since the transmission cost is reduced significantly with the use of DWDM systems having large number of wavelengths, 40 or 80, and long regeneration spans, of up to 3,000 km. Therefore, to obtain the most economic network design, the node cost must be reduced. This is achieved by creating express routes between specific nodes, which will carry large amount of traffic bypassing intermediate nodes.

The alternatives to mesh are the ring architectures. Today, BLSR is the most deployed in backbone ring networks. Ring architectures allow a fast and simple restoration mechanism compared to the complexity of mesh restoration. Restoration bandwidth is allocated in each ring such a way that any single failure is resolved in that very same ring, without any repercussion on the rest of the network (ring failure isolation). Taking all that into account, it can be concluded that ring architectures are usually more robust than mesh; however, mesh architectures are more economical than ring architectures.

A Line Shared Protection Rings (LSPR) architecture is an extension of BLSR. LSPR takes the benefit of the fast restoration of the ring architectures, and the economics of the mesh architectures. The differential characteristic is sharing of the restoration bandwidth among several rings. The restoration bandwidth in a link is shared by several rings and can be used to protect against a failure in one ring at a time.

Returning to FIG. 2, traffic grooming is performed at step 20. It is assumed that the network uses digital cross-connects and IP routers as traffic grooming devices. Here, the aim is to reduce the number of expensive OXC (optical cross connect) drop ports by bundling low bit rate traffic into optical channels. One option for bundling is end-to-end bundling where all low bit rate traffic is bundled in the same optical channel on each pair of nodes. Another option is the bundling optimization where the low bit rate signals are routed such that the number of optical channels in the network is minimized. Cost optimization could be also done for bundling. The low bit rate traffic is re-routed such that the network cost including OXC ports, amplifiers, regenerators, and fiber length are minimized. Switching between bundling techniques would change the number of optical channels, OXC ports, and the number of other transmission devices, which would in turn, result in an entire different design.

The modeling module then performs express route optimization in step 22 where it defines the optimal set of end-to-end optical channels by bypassing intermediate nodes in order of reduce the number of expensive OXC ports. Bypassing nodes, however, requires more transmission equipment by the regenerated spans, increasing transmission costs. While bypassing nodes thus presents a trade-off between transmission cost versus node cost (OXC ports), the savings in node costs generally dominate the extra expenses in transmission cost. The express optimization step starts with an initial set of logical spans (routes) and slowly eliminates the spans one-by-one. An integer linear programming technique is used to maximize the savings. Depending on the initial set of logical spans, the optimization could give different solutions; therefore, altering the initial set of logical spans could result in a different network design.

The last step in modeling is network dimensioning where nodes and spans are dimensioned to carry the traffic demand with the required protection level. Since each architecture considered has a different protection scheme (mesh, BLSR, LSPR, etc.), the dimensioning is done specifically for each architecture as shown in steps 24, 26 and 28. Working and protection paths are calculated by using one of the following criteria: (1) minimizing path length, (2) minimizing number of hops, or (3) minimizing cost, considering OXC ports, amplifiers, regenerators, and fiber. Using a different minimizing technique would give a different design; therefore, it would change the availability and cost. Span design is also done by considering different transmission types (i.e. Long Haul, Very Long Haul, Ultra Long Haul). The aim is again to minimize the cost. After all these steps, a model for each basic architecture is created and a cost for each architecture is calculated in step 30.

After the initial cost modeling is done for a considered architecture, the availability analysis is performed by the availability analysis module 12 given in FIG. 1. In the availability analysis, availability for each end-to-end connection is calculated by considering working and restoration components. Since restoration is performed differently in different architectures, the availability calculation separately for mesh and rings is described below.

FIG. 3 illustrates a diagram of an end-to-end path for a restorable mesh architecture between source 36 and destination 38. In a restorable mesh architecture, for a connection between two end nodes of a demand, there are one working path and one or several protection paths. A path, as shown in FIG. 3, is made up of one or more spans contains three major components: fiber 40, line equipment including line amplifiers 42 and regenerators 44, and nodal equipment including cross-connects 46.

Availability of a path is calculated by using the availability figures of components along each span in the path in a serial manner. Assuming that there are $m_i$ number of in-line amplifiers and $n_i$ number of regenerators in $span_i$, and $L_i$ is the fiber length of the $span_i$, then the availability of the $span_i$ would be $A_{span_i}$ (given below) where $A_{amp}$ is the availability of an amplifier, $A_{regen}$ is the availability of a regenerator, and $A_{fiber}$(L) is the availability of a fiber of length L:

$$A_{span_i} = A_{fiber}(L_i) \times \prod_{k=1}^{m_i} A_{amp_k} \times \prod_{k=1}^{n_i} A_{regen_k} \quad (1)$$

Assuming that a path has h number of hops and $A_{node}$ represents the availability of an intermediate node, then the availability for the path without source and destination would be $A_{path}$ (given below):

$$A_{path} = \left\{ \bigwedge_{k=1}^{h} A_{span_k} \right\} \wedge \left\{ \bigwedge_{k=1}^{h-1} A_{node_k} \right\} \quad (2)$$

Let $A_{destination}$ and $A_{source}$ represent the availability of the destination and the source nodes, respectively and let $A_{w\_path}$ and $A_{p\_path}$ represent the availability of working and protection paths, respectively. In the end-to-end channel connection availability, $A_{e2e}$ (given below), there are working path and protection path(s) one for each potential span failure:

$$A_{e2e} = A_{source} \times A_{destination} \times \left\{ A_{w\_path} \vee \left\{ \bigvee_{k=1}^{h} A_{p\_path_k} \right\} \right\} \quad (3)$$

In the equations above, the "$\wedge$" and "$\vee$" represent a serial and parallel system availability calculation of paths, respectively considering the common components/entities that may exist in more than one path. For example, some of the nodes and/or spans may be shared in more than one protection or working path. In such cases, duplications cancel out from the solutions set.

FIGS. 4a-b illustrates ring structures connecting nodes 46. For a BLSR single ring, as shown in FIG. 4a, there is a working path and, for each node or link failure on this path, there is a looped back protection path. If one or more links and/or intermediate nodes fail on the working path, a corresponding looped back protection path is formed isolating the failure section.

Therefore, there are multiple different protection paths covering for all the failure scenarios in the working path. After the mathematical exercise for covering all the failures is done, all restoration paths reduce to one single protection path for a given working path, shown in FIG. 4b.

LSPR architectures implement Network Protection Equipment (NPE) techniques in such way that the restoration mechanism will be based on path switching instead of link switching. Therefore, as picture in FIG. 4b, for all link and/or node failures on the working path, a single protection path is used. Notice that BLSR and LSPR become equivalent from availability perspective for a single ring. Therefore, the availability of a single ring end-to-end connection for both BLSR and LSPR is mathematically complete by the $A_{e2eSinglering}$ definition:

$$A_{e2e\_Singlering} = A_{source} \times A_{determination} \times \{A_{w\_path} + A_{p\_path} - A_{w\_path} \times A_{p\_path}\} \quad (4)$$

In the above equation, $A_{source}$ and $A_{destination}$ represent the availability of source and destination nodes. $A_{w\_path}$ and $A_{p\_path}$ represent the availability of working and protection paths, which are defined previously. Within the curly bracket, the parallel system availability of working and protection paths is calculated.

As used herein, the "gate node" is the node used to interconnect two rings and the "border section" is the common set of nodes and links between two rings. For each end-to-end connection that is routed through multiple rings, several gate nodes and border sections will be crossed. In addition to source and destination nodes, gate nodes in a multi-ring connection constitute a single point of failure where each intermediate ring has redundancy with the provided protection mechanism. Therefore, the availability of these entities is composed together in a serial manner for the end-to-end multi-ring availability, $A_{e2eMultiplerings}$ (given below), in the multi-ring formula. Multiplication is used for the single point of failure entities and the $\Lambda$ represents the serial system availability calculation of such rings considering the common components that may exist in the same border section. According to the ring architecture deployed, BLSR or LSPR, the border section will have more or less common elements. The end-to-end multi-ring availability can be calculated as:

$$A_{e2e\_Multiplerings} = A_{source} \times A_{destination} \times \prod_{i=1}^{N-1} A_{gatenode\_i} \times \left\{ \bigwedge_{i=1}^{N} A_{Intermediatering} \right\} \quad (5)$$

An intermediate ring has also working path and protection path at opposite bounds of the ring for the transit demand traffic, and its availability is calculated similar to a single ring without the source and destination nodes.

As stated above, the invention can be used with any type of network structure and, therefore, calculations for availability will need to be determined for the types of network structures being considered.

At the end of each availability analysis, a solution is classified as Acceptable, Unacceptable, or Improvable. The formal definition of this classification is done by using the notation below:

N: Number of end-to-end channel connections.

$p_i$: availability of connection i.

$P^N(a,m) = \{p_1, p_2, p_3, \ldots, p_N\}$: set of availability of all "N" connections by using architecture "a" and optimisation parameter set "m".

$T^N = \{t_1, t_2, t_3, \ldots, t_N\}$: set of desired availability of "N" connections.

$A^N(a,m)$: Subset of connections whose availability values are above a threshold value $t_i$, $A^N(a,m) \subseteq P^N(a,m)$ and $p_i \in A^N(a,m)$ if $p_i \geq t$.

$C^N(a,m)$: cost of the solution with "N" connections by using architecture "a" and optimisation parameter set "m".

K: an integer value where 0<K<N.

If all the connections in an architecture are above their corresponding desired availability values (threshold values), as shown below, then the solution is called "Acceptable":

If $|A^N(a,m)|=N$ then $P^N(a,m)$ is "Acceptable".

If the number of connections above their desired availability values (threshold value) is less than K, then the solution is not considered at all and is called "Unacceptable":

If $|A^N(a,m)|<K$ then $P^N(a,m)$ is "Unacceptable".

If the number of connections above availability threshold values is equal or greater than K, then the solution is considered for incremental improvement and is called "Improvable":

If $|A^N(a,m)|\geq K$ then $P^N(a,m)$ is "Improvable".

Figure 5:
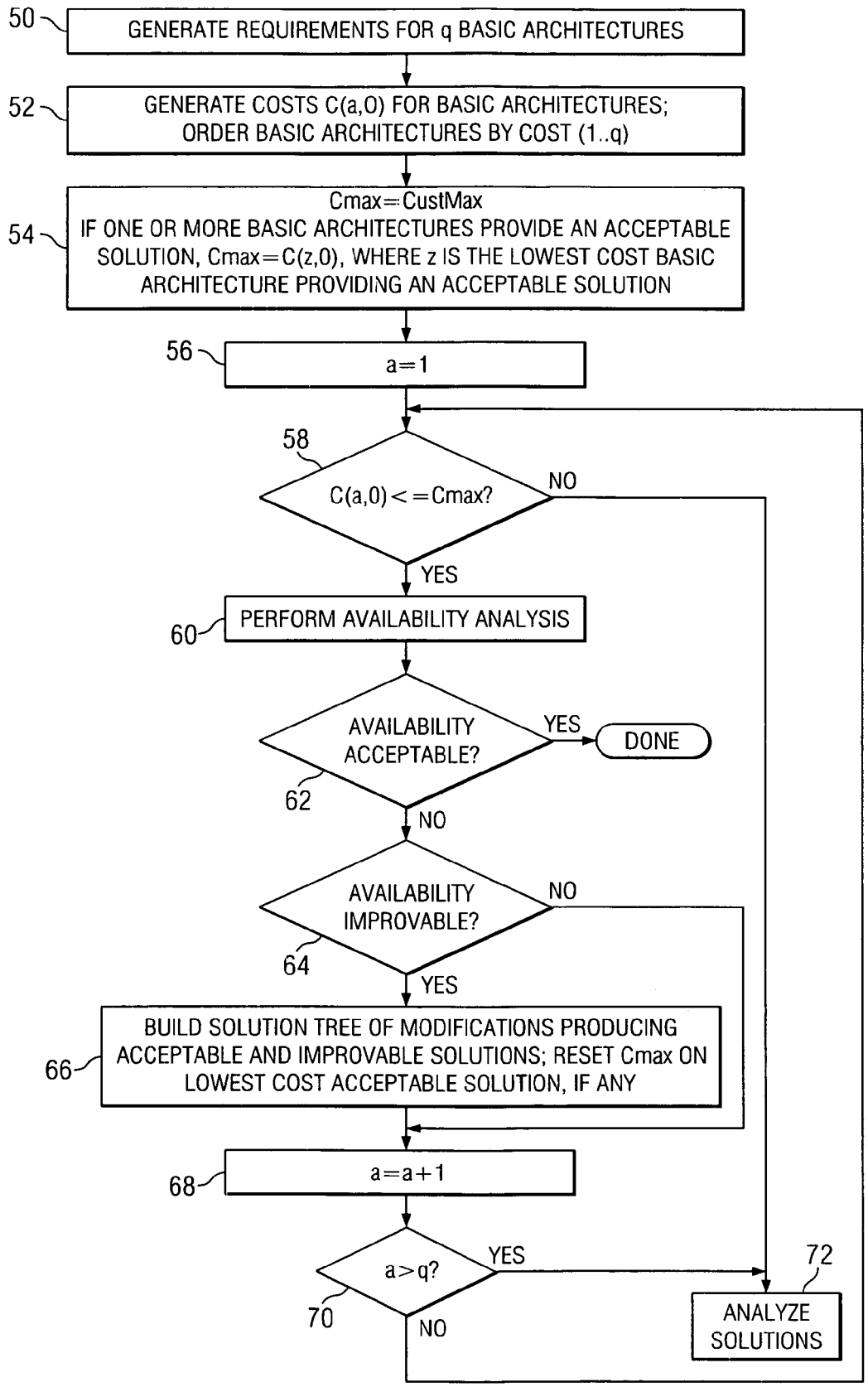
FIG. 5 illustrates a general flow chart for a preferred embodiment of the availability analysis.

FIG. 5 illustrates a flow chart for evaluating different network structures. In step 50, the requirements for q basic architectures under consideration are generated. In the example illustrated herein, q=4; where the four basic architectures are a mesh architecture with and without express routes, a LPSR Ring architecture and a BLSR ring architecture. The requirements will be used to evaluate the basic architectures analyze cost and availability for each architecture.

In step 52, the cost, $C^N(a,0)$, of each of the q basic architectures is generated using the equipment specified in step 50, where $C^N(a,m)$ is the cost of a solution having N connections, using architecture a (between 1 and q) and optimization set m. For the basic architecture, m=0. Also, the basic architectures are ordered by cost, such that $C^N(1,0)$ is the least expensive solution and $C^N(q,0)$ is the most expensive solution.

In steps 54 through 72, an optimum or near-optimum solution is determined, starting from the basic architectures, being modified as necessary to find an acceptable solution at an acceptable price. In step 54, an initial maximum cost is determined. $C_{max}$ is set to the service provider's maximum stated cost (CustMax); if one or more of the basic architectures provide an acceptable solution at a cost below the service provider's maximum stated cost, the cost of the least expensive acceptable solution is used as $C_{max}$. If none of the basic architectures provide an improvable or acceptable solution below the service provider's maximum stated cost, then a solution cannot be found using the basic architectures. This would result in either the initial $C_{max}$ being raised, or additional basic architectures being generated.

In step 56, the evaluation begins with the least expensive basic architecture (a=1). In step 58, if $C^N(1,0)$ (for the first iteration) is less than or equal to $C_{max}$, then an availability analysis is performed in step 60. As stated above, if $C^N(1,0) > C_{max}$, then there would be no solutions that met the cost standard from the service provider.

As described above in connection with FIGS. 3, 4a and 4b, the availability analysis looks at each end-to-end connection and determines whether the connection meets a predetermined availability threshold. The number of connections which fail to meet the threshold determine whether the architecture is considered acceptable, improvable, or unacceptable.

In step 62, if the basic architecture is acceptable, then the evaluation is done, since the lowest cost basic architecture meets the service provider requirements. If it is not acceptable in step 62, then it is determined whether the basic architecture is improvable in step 64. If the architecture is not improvable, then it is unacceptable (too many connections below the availability threshold) and the next basic architecture is selected (steps 68 and 70). Otherwise, if the present basic architecture is improvable in step 64, then the iterative process shown in FIG. 1 is performed, preferably using a solution tree described in FIGS. 6-8, whereby modifications on the basic architecture are evaluated. As the solution tree is generated, $C_{max}$ may be reduced if acceptable solutions are found.

Even if an acceptable solution is found in the solution tree of step 66, the other architectures are evaluated using steps 58 through 66. However, once an acceptable solution is found in any of the solution trees associated with a basic architecture, $C_{max}$ may be reduced. This will likely reduce the size of subsequent solution trees (which will only be generated if the cost of the respective basic architectures are below $C_{max}$).

Once all architectures are considered, the solutions are evaluated in step 72.

Figure 6:
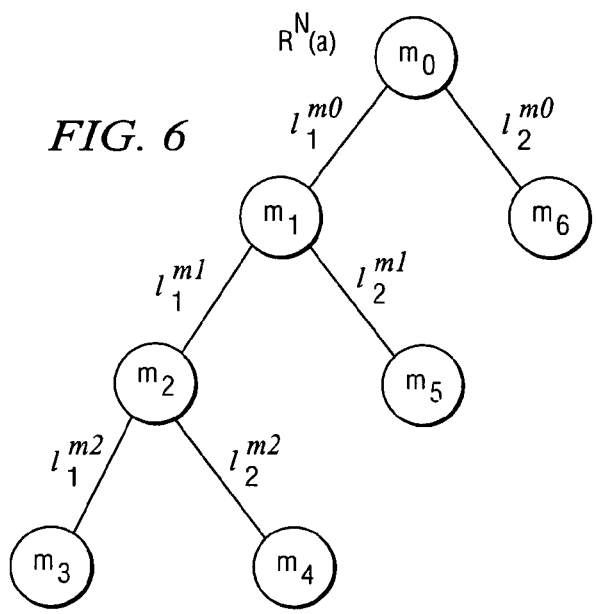
FIG. 6 illustrates a solution tree for the availability analysis.

FIGS. 6 though 10 illustrate the solution tree step 64 which implements the iterative process shown in FIG. 1. FIG. 6 illustrates a solution tree, where each node represents a solution with a specific set of optimization parameters, $m_i$, and corresponding cost and availability values derived by executing cost modeling 10 and availability analysis modules 12 as described above. The root of the tree represents the initial set of optimization parameters, $m_0$, of the basic architecture. A line from a node m, $l_i^m$, represents a modification/update in the optimization parameter set m, that would improve the solution in terms of number of connections above the availability threshold, with a potential cost increase.

In the case where there could be an improvement, the new optimization set $m_{new}=l_i^m \otimes m$ with the $l_i^m$ improvement on m, constitutes a child node of the parent node m. $C_{max}$ remains a variable cost limitation for a solution. Initially, $C_{max}$ is the ultimate maximum cost for a solution that an service provider wants to spend, including the availability improvement. However, this value may be reduced in the solution tree construction algorithm to prune some more expensive solution(s) once a lower cost "Acceptable solution" exists. Each node m has cost, $C(a, m_i)$, and availability, $P(a, m_i)$, values.

The procedure starts with an initialization function, initialize_solution_tree( ) given below:

```
initialize_solution_tree(a,m,C_max,T^N,K)
  R_a ← create_tree( )/*initializes a tree structure & returns the pointer */
  /*If initial solution is Unacceptable, will return empty tree*/
  if {|A^N(a,m,T^N)| ≤ K or C^N(a,m) > C_max} then
    insert(R_a,null,null,null); return (R_a)
  end_if
  /*If initial solution is Acceptable, will return the solution only */
  if {|A^N(a,m,T^N)|==N} then
    insert(R_a,null,null,m); return (R_a)
  end_if
  /*If improvable case, search for the optimal solution by constructing a
  solution tree */
  Disk-Write (null, C_max)
  construct_tree(R_a,m, T^N)
  Disk-Read (m_opt, C_max)
  /*If optimal solution found,will return tree with this solution only*/
  If (m_opt ≠ null) then
    Insert(R_a,null,null,m_opt); return (R_a)
  end_if
  /* if optimal solution not found, will return the entire solution tree
  constructed by the construct_tree(..)*/
  return (R_a)     /* tree of improvable solutions */
end initialize_solution_tree
```

This procedure discovers if the initial solution is either an "Unacceptable solution" or an "Acceptable solution". In case of the unacceptable solution, it returns a null tree and the procedure ends; in the acceptable solution case it returns the root node only representing a unique solution, and the procedure ends. For the "improvable" solution case, another procedure, construct-tree( ), given below, is called to build the solution space in a tree structure.

If an one or more acceptable solutions are found while building the solution tree, construct-tree( ) will return the optimal solution (i.e., the lowest cost acceptable solution). If no acceptable solutions are found, the entire solution tree will be returned, so that the various nodes can be analyzed to find the best solution.

```
The construct-tree( ) procedure is given below:
construct_tree(R_a,m, T^N)
   for each modification l_i^m do
      m_new ← l_i^m $$ m;
      Disk-Read (m_opt, C_max)
      if {|A^N(a,m_new,T^N)| > |A^N(a,m,T^N)|} and {C(a, m_new) ≤ C_max }
         insert(R_a,m, l_i^m, m_new);  /* In tree R_a, inserts the new node
   m_new to the parent node m with the link l_i^m */
         if {|A^N(a,m_new,T^N)|==N}
            Disk-Write (m_new, C(a, m_new)) /*optimal solution so far */
         else
            construct_tree(R_a, m_new, T^N)
         end_if
      end_if
   end_for
end construct_tree
```

For each modification, a new node ($m_{new}$) is created from a parent node and the improvement. The previous optimal case ($m_{opt}$) and its cost ($C_{max}$) are read from memory. The new node is inserted to the parent node only if its availability value $A^N$ is better than the availability value of parent node and if its cost is equal to or below $C_{max}$. If the availability of all nodes exceeds the stated thresholds, then $m_{new}$ becomes the new optimal solution, since it has acceptable availability at the lowest cost. This data is then written to memory.

Otherwise, it is possible that new node with a further improvement can be added. If the overall availability and cost at a node are satisfactory except for the availability figures of a few end-to-end connections, the availability analysis module 12 reveals the factors which cause unsatisfactory availability for those few connections, and suggests a modelling module to perform further optimizations on those factors which can improve the connections, $l_i^m$'s in the tree structure of FIG. 6, in terms of availability. When an improvement is made, one or more connections could move above the threshold region, leading to an acceptable availability value for the network, or to an availability value that is improved, yet needs to be improved further to be acceptable.

Assume that acceptable level of availability for each end-to-end connection is given, as five 9's (99.999%). As a result of this analysis procedure, one can classify end-to-end connections as below threshold and above threshold. The classification may suggest improving only below-threshold connections because the percentage of such connections is relatively low and/or their availability can be easily brought over the threshold value. In such a case the modeling exercise would have enough information on factors causing low availability, to perform further improvements on those below-threshold connections. Those improvements could be:

1) Network element redundancy: The availability of a network element could be improved by providing internal protection through redundancy of the components (a second copy of switching matrix, power supply, etc.) implying higher cost of the network element. This could be either a network wide upgrade, such as new generation of amplifiers in every span in the network, or relating a specific NE, such as a cross connect at a congested location.

2) Reduction of number of network elements passed through: There are multiple ways to achieve this, which can be illustrated with two examples. First, advanced transmission techniques, such as Raman amplification, allows extended regeneration distances up to 3000 km between regenerators (as compared to approximately 800 km for a conventional transmission system) which in turn reduces the total number of regenerators for the path. This may significantly impact path availability, since regenerators have relatively lower availability figures. However, those advance transmission systems are very costly. Second the reduction of the number of network elements can be also achieved by modifying the end-to-end paths. For each demand, the cost optimization algorithms routes the paths such that the total network cost is minimized. Cost minimization does not always suggest the shortest path, assuming that the shortest path would also be the cheapest path in terms of quantity of network elements. Therefore, alternative working and/or protection paths with fewer network elements could be used to improve end-to-end availability over the acceptable level.

3) Path diversity enrichment: end-to-end connection availability would increase with higher diversity in working and protection paths. Therefore, another option for improvement in an unacceptable availability for an end-to-end connection is to use more diverse routes for paths. Note that link and/or node disjoint paths would further improve the end-to-end availability.

In this methodology, an iterative combination of such alternatives could be tried a reasonable number of times, to reach a design with an acceptable level for both cost and availability.

Another scenario would be that the percentage of connections having availability figures below the acceptable level is high, but yet the network is still an improvable case. In this case, the availability analysis module may suggest architectural changes for consideration. For a two layer architecture, for example, results of the availability analysis might suggest a change in some of the parameters that play a role in splitting the network in two different layers, (subnetworks), improving the overall availability figures. Two layer networks are discussed in A. Lardies, A. Aguilar, "Planning methodology for SDH and optical networks", in Proceedings of Design of Reliable Communication Networks 1998, page 020.

In this case, another iteration is run for the new architecture with new parameters, to reach an acceptable level of availability for the entire network. The solution tree is initialized with the initial set of optimisation parameters, $m_0$, which represents the root node. If it is an improvable case, the tree construction procedure builds the solution tree, as seen in FIG. 6.

Figure 7:
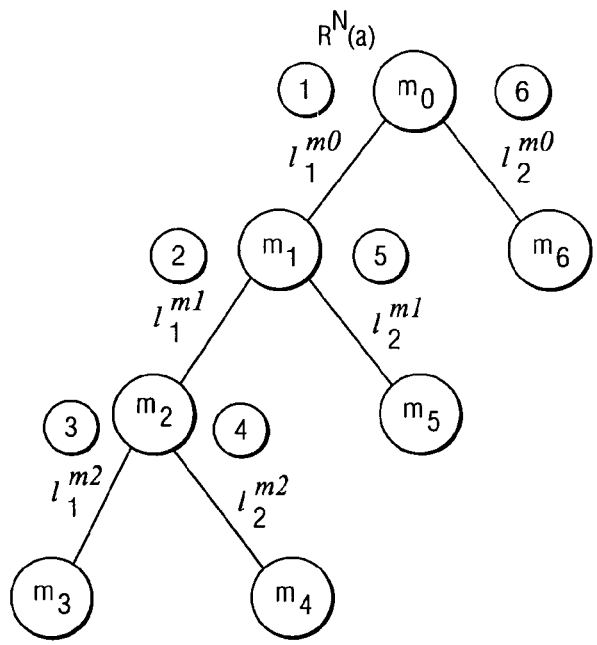
FIG. 7 illustrates a depth-first solution tree.

FIG. 7 illustrates an example of a tree that is generated "depth-first" as shown in the construct-tree( ) procedure above. Each branch of the tree is labeled with a number indicating its position in the sequence. In a depth first tree, if a node does not result in acceptable availability, a new node is spawned with an improvement from that node until an acceptable availability is found, or $C_{max}$ is exceeded (or until no more improvements are possible). Once the end of a branch is reached, new branches are generated from the parent node, to the extent possible.

Using a "depth-first" technique, $C_{max}$ will generally be reduced at a faster pace, thereby eliminating more nodes from consideration.

Figure 8:
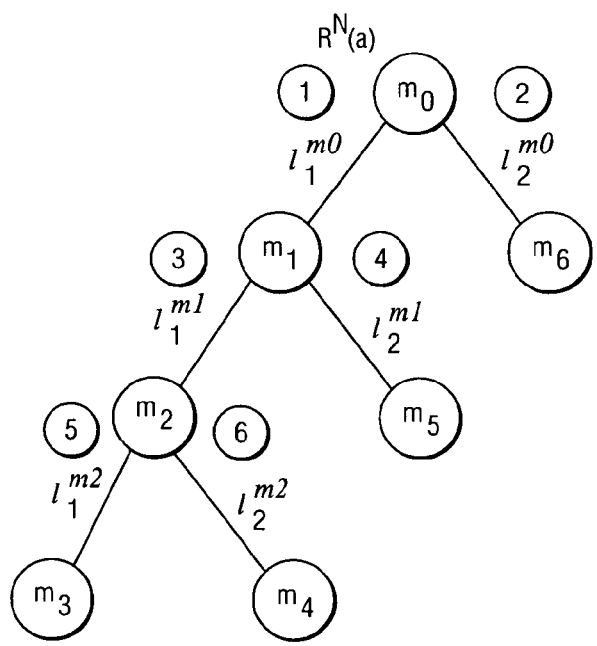
FIG. 8 illustrates a breadth-first solution tree.

FIG. 8 illustrates an example of a tree that is generated "breadth-first". In a breadth-first tree, all possible improvements for a node (or nodes at the same level) are generated prior to generating nodes at the next level.

Figure 9:
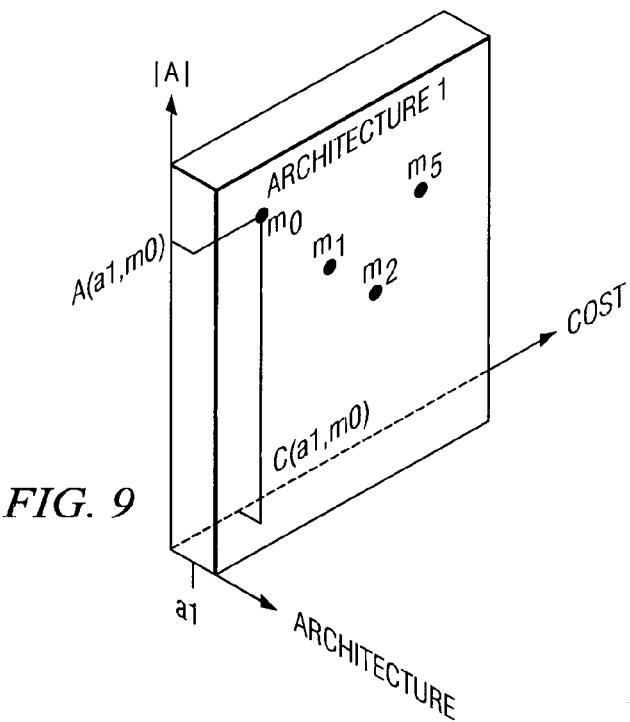
FIG. 9 illustrates a solution set provided by a single solution tree for a respective network architecture.

In some cases, no architecture will result in a network with acceptable availability values while remaining at or below $C_{max}$. For each architecture, the solution tree is reduced to a solution plane, as shown in FIG. 9. Every node of each tree represents a solution, with different availability and cost figures.

Figure 10:
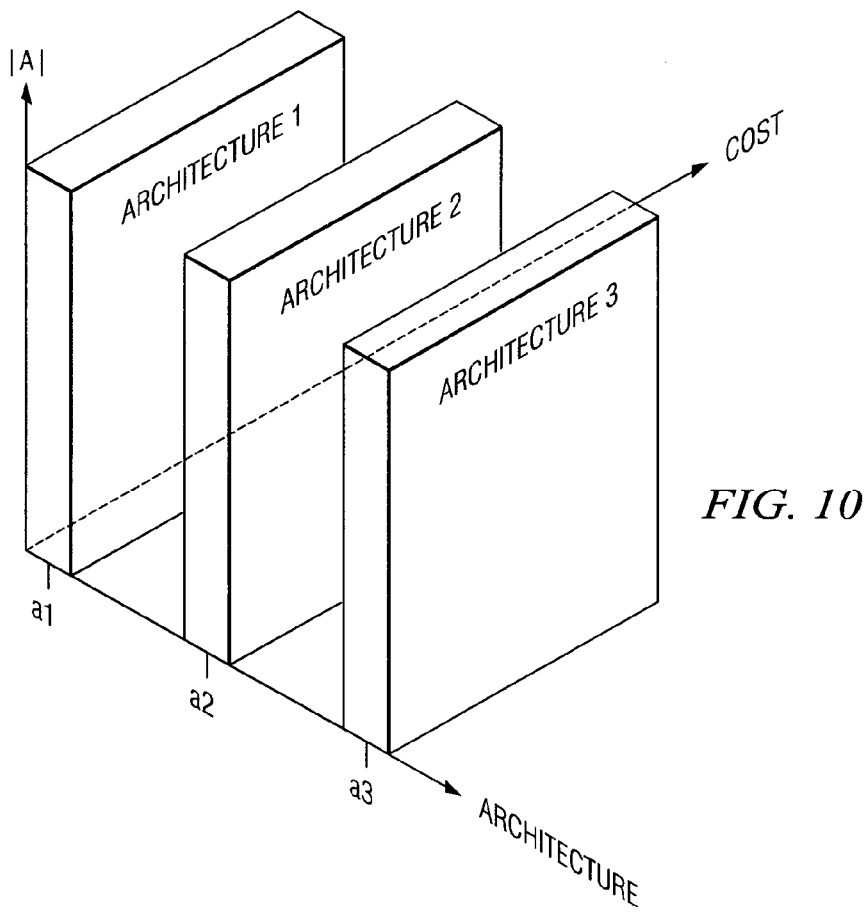
FIG. 10 illustrates a solution space for multiple solution sets provided by a multiple solution tree for respective network architectures.

Multiple solution trees for multiple architectures are shown in FIG. 10. For the multiple architectures considered, a "forest" of solution trees exists. By reducing each tree to a plane, a forest can be reduced to a 3-D solution space with multiple planes. From the 3D solution space, one can choose a solution with a set of certain requirements, by considering all architectures.

To choose a solution from the 3D solution space, several approaches can be taken. A first approach would be to take the solution with the highest availability. This solution can be determined as:

$$\max_{i,j}\{|A^N(a_i,m_j)|\}$$

A second approach would be to take the most cost efficient solution. This solution could be determined as:

$$\min_{i,j}\{C^N(a_i,m_j)/|A^N(a_i,m_j)|\}$$

A third approach would be to use a weighted adaptive solution, where weights $\omega_a$ and $\omega_c$ are defined as the weight for availability and cost, respectively; where $0 \leq \omega_a \leq 1$, $0 \leq \omega_c \leq 1$ and $\omega_A + \omega_c = 1.0$. In this case, $$A_{max} = \max_{i,j}\{|A(a_i,m_j)|\}, A_{min} = \min_{i,j}\{|A(a_i,m_j)|\}$$

$$f_A(a_i,m_j) = 1 - \{(|A(a_i,m_j)| - A_{min})/(A_{max} - A_{min})\}$$

$$C_{max} = \max_{i,j}\{C(a_i,m_j)\}, C_{min} = \min_{i,j}\{C(a_i,m_j)\}$$

$$f_C(a_i,m_j) = (C(a_i,m_j) - C_{min})/(C_{max} - C_{min})$$

After choosing $\omega_a$ and $\omega_c$, the solution is given by:

$$\min_{i,j}\{\omega_A f_A(a_i,m_j) + \omega_C f_C(a_i,m_j)\}.$$

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the claims.

The invention claimed is:

1. A method of determining a model for a communications network by a computing device, comprising:
   determining by the computing device a cost for a network model having a plurality of nodes and paths through the network;
   generating by the computing device availability values for all traffic-carrying paths through the network model;
   if a percentage of paths having an availability value above a predetermined availability threshold is within a predetermined range:
      modifying by the computing device the network model to produce a current network model to increase availability values of at least some of the paths;
      determining by the computing device a cost for the current network model;
      generating by the computing device availability values for all traffic-carrying paths through the current network model, if the cost of the current network model is below a predetermined maximum cost; and
      repeating said steps of modifying the network model, determining a cost for the current network model, and generating availability values by the computing device for all traffic-carrying paths through the current network model until all paths of the current network model are above the predetermined availability threshold at a cost below the predetermined maximum cost, or until no further improvements can be made to the network model while remaining below the predetermined maximum cost.

2. The method of claim 1 and further comprising reducing by the computing device the predetermined maximum cost to a cost associated with a current network model having all traffic-carrying paths above the predetermined availability threshold.

3. The method of claim 1 and further comprising the step of repeating by the computing device said steps of modifying the network model, determining a cost for the current network model, and generating availability values for all traffic-carrying paths through the current network model until all paths of the current network model are above the predetermined availability threshold at a cost below the predetermined maximum cost, or until no further improvements can be made to the network model while remaining below the predetermined maximum cost, in order to determine whether a different network model with a lower cost can be obtained.

4. The method of claim 1 wherein said step of modifying said network model includes the step of increasing redundancy of components in a path with an availability value below a predetermined threshold.

5. The method of claim 1 wherein said step of modifying said network model includes the step of removing one or more network elements in a path with an availability value below a predetermined threshold.

6. The method of claim 1 wherein said step of modifying said network model includes the step of improving path diversity associated with a path with an availability value below a predetermined threshold.

7. A method of determining by a computing device a communications network structure, comprising the steps of:
   defining by the computing device multiple basic architectures;
   generating by the computing device a cost value for each basic architecture;
   selecting by the computing device a basic architecture of the network architecture;
   iteratively performing the steps of:
      generating by the computing device a cost value for the selected network architecture;
      performing by the computing device an availability analysis to identify which traffic-carrying paths, if any, have availability values below a predetermined threshold; and
      improving by the computing device the selected network architecture responsive to the identified traffic-carrying paths;
   until an acceptable solution is achieved or determined not to exist for the selected network architecture, and if an acceptable solution is determined not to exist for the selected network architecture, selecting by the computing device a different basic architecture for the network architecture.

8. The method of claim 7 wherein the step of selecting a basic architecture comprises the step of selecting the basic architecture with the lowest cost value.

9. The method of claim 7 and further comprising the step of setting a maximum cost value as the lesser of a specified value and the cost value associated with a least expensive basic architecture with no paths below an acceptable threshold.

10. The method of claim 9 wherein an acceptable solution has no paths below an acceptable threshold and a cost value at or below the maximum cost value.

11. The method of claim 10 wherein, upon finding an acceptable solution, the maximum cost value is set to a lowest cost value associated with an acceptable solution for the selected network architecture.

12. The method of claim 11 and, if another basic architecture is selected as the basic architecture, iteratively performing the following steps of:

generating by the computing device a cost value for the selected network architecture;

performing by the computing device an availability analysis to identify which traffic-carrying paths, if any, have availability values below a predetermined threshold;

improving by the computing device the selected network architecture responsive to the identified traffic-carrying paths; and until an acceptable solution having a cost value below the maximum cost value is achieved or determined not to exist for the selected network architecture.

\* \* \* \* \*

UNITED STATES PATENT AND TRADEMARK OFFICE
CERTIFICATE OF CORRECTION

PATENT NO. : 7,646,730 B2  Page 1 of 1
APPLICATION NO. : 10/926818
DATED : January 12, 2010
INVENTOR(S) : Cankaya et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1486 days.

Signed and Sealed this

Twenty-eighth Day of December, 2010

David J. Kappos
*Director of the United States Patent and Trademark Office*